(12) United States Patent
Katagiri et al.

(10) Patent No.: US 7,994,270 B2
(45) Date of Patent: Aug. 9, 2011

(54) METHOD FOR PRODUCING THERMOSETTING RESIN HAVING BENZOXAZINE RING

(75) Inventors: Tomoaki Katagiri, Kashina (JP); Yuji Eguchi, Ibaraki (JP)

(73) Assignee: Sekisui Chemical Co., Ltd, Osaka (JP)

( * ) Notice: Subject to any disclaimer, the term of this patent is extended or adjusted under 35 U.S.C. 154(b) by 0 days.

(21) Appl. No.: 12/670,932

(22) PCT Filed: Aug. 1, 2008

(86) PCT No.: PCT/JP2008/063850
§ 371 (c)(1),
(2), (4) Date: Apr. 29, 2010

(87) PCT Pub. No.: WO2009/017218
PCT Pub. Date: Feb. 5, 2009

(65) Prior Publication Data
US 2010/0210810 A1    Aug. 19, 2010

(30) Foreign Application Priority Data

Aug. 2, 2007   (JP) .................................. 2007-201696

(51) Int. Cl.
*C08G 65/10* (2006.01)

(52) U.S. Cl. ............ 528/94; 544/94; 544/106; 528/137; 528/153; 528/403

(58) Field of Classification Search ............... 544/94, 544/106; 528/94, 137, 153, 403
See application file for complete search history.

(56) References Cited

U.S. PATENT DOCUMENTS

2003/0023007 A1 * 1/2003 Reardon ............ 525/430
2009/0054614 A1   2/2009 Eguchi et al.
2009/0187003 A1   7/2009 Eguchi et al.
2009/0318658 A1  12/2009 Chiku et al.

FOREIGN PATENT DOCUMENTS

| JP | 11-106465 | 4/1999 |
| JP | 11-228786 | 8/1999 |
| JP | 2000-273135 | 3/2000 |
| JP | 2001-278934 | 10/2001 |
| JP | 2002-338648 | 11/2002 |
| JP | 2004-285195 | 10/2004 |
| JP | 2005-213301 | 8/2005 |
| JP | 2006-096891 | 4/2006 |
| WO | 2007/037206 | 4/2007 |
| WO | 2007/097305 | 8/2007 |
| WO | 2007/129640 | 11/2007 |

OTHER PUBLICATIONS

International Preliminary Report on Patentability, including the Written Opinion (in English) dated Feb. 24, 2010 that issued with respect to PCT/JP2008/063850.

Japanese Office Action for corresponding Japanese Application JP 2008-558999, dated Mar. 3, 2009 (in Japanese).

* cited by examiner

*Primary Examiner* — Randy Gulakowski
*Assistant Examiner* — Shane Fang
(74) *Attorney, Agent, or Firm* — Greenblum & Bernstein, P.L.C.

(57) ABSTRACT

The present invention provides a method for producing a thermosetting resin having a benzoxazine ring, comprising the step of:

reacting a bifunctional phenol compound, a diamine compound, and an aldehyde compound in a mixed solvent of an aromatic nonpolar solvent and an alcohol.

20 Claims, No Drawings

METHOD FOR PRODUCING THERMOSETTING RESIN HAVING BENZOXAZINE RING

TECHNICAL FIELD

The present invention relates to a method for producing a thermosetting resin having a benzoxazine ring and a thermosetting resin having a benzoxazine ring obtained by the production method.

BACKGROUND ART

Thermosetting resins having a benzoxazine ring in their molecular structure have excellent properties which are not observed in other thermosetting resins, such as dimensional stability, electric insulation properties and low water absorption properties in addition to heat resistance and flame retardancy. Therefore, it has recently drawn attention as an electronic material such as a laminate sheet and a semiconductor sealing material and a binder such as a friction material and a grinding stone.

A benzoxazine ring is a composite ring of a benzene ring and an oxazine ring and has a structure represented by the following formula (I):

Formula (I):

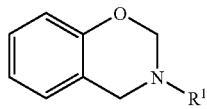

(In formula (I), $R^1$ represents any organic group.)

In order to efficiently synthesize a thermosetting resin having a benzoxazine ring which has the excellent properties as described above, technological studies have been made on a synthetic method thereof in recent years. The technical points for efficiently synthesizing the same are as follows: 1) prevention of gelation of a reaction solution and insolubilization of a reaction product by controlling the reaction; and 2) facilitation of a synthetic process.

Patent Document 1 discloses a method in which phenols, paraformaldehyde, and monoamines are reacted in an organic solvent, specifically, an alcoholic solvent.

However, the method disclosed in Patent Document 1 employs a process of adding firstly phenols and paraformaldehyde to an organic solvent and controlling the temperature and then adding monoamines little by little, in order to suppress a rapid progress of the reaction due to a heat generation during the synthesis and the gelation of the reaction solution and insolubilization of the reaction product accompanying the rapid progress of the reaction. Therefore, equipments such as a temperature controller and a dropping pump are required, and the resulting synthetic process is complicated. It is also necessary to pay great attention to the temperature control during the synthesis.

Patent Documents 2 and 3 disclose methods of using an aprotic solvent (except dioxane) as an organic solvent in order to solve the above problems.

[Patent Document 1] Japanese Patent Laid-Open No. 2000-273135
[Patent Document 2] Japanese Patent Laid-Open No. 2002-338648
[Patent Document 3] Japanese Patent Laid-Open No. 2005-213301

DISCLOSURE OF THE INVENTION

Problems to be Solved by the Invention

However, although the methods disclosed in Patent Documents 2 and 3 have a technical feature in that each raw material can be added to an organic solvent by one operation, it is always necessary to pay great attention to the gelation of the reaction solution and insolubilization of the reaction product due to the rapid progress of reaction in the early stage of the reaction. Actually, in the methods disclosed in Patent Documents 2 and 3, the raw materials are added to the aprotic solvent (except dioxane) and then two steps of temperature control are performed.

Further, in order to aim at improvement in various performances such as heat resistance, flexibility, and electrical insulation properties of a final product such as a film obtained by subjecting a thermosetting resin having a benzoxazine ring to ring opening polymerization, it is desired to obtain a thermosetting resin having a benzoxazine ring that is of high molecular weight as much as possible, specifically, a thermosetting resin having a benzoxazine ring with a weight average molecular weight (Mw) of 2,000 or more and 500,000 or less in terms of polystyrene as measured by gel permeation chromatography.

However, the methods disclosed in Patent Documents 1 to 3 cannot synthesize a thermosetting resin having a benzoxazine ring with an Mw of 2,000 or more. These methods also have problems that the control of reaction is difficult and there is a high possibility of gelation of the reaction solution and insolubilization of the reaction product.

In view of the above circumstances, an object of the present invention is to provide a method for producing a thermosetting resin having a benzoxazine ring with being of high molecular weight, wherein gelation of a reaction solution and insolubilization of a reaction product do not occur during the synthetic reaction and the synthetic process is easy.

Means for Solving the Problems

As a result of intensive and extensive studies on the above problems by the present inventors, it has been found that the above problems can be solved by the following means, and the present invention has been completed based on these findings.

That is, the present invention provides a method for producing a thermosetting resin having a benzoxazine ring and a thermosetting resin having a benzoxazine ring obtained from the production method, as described below.

[1]
A method for producing a thermosetting resin having a benzoxazine ring, comprising the step of reacting a bifunctional phenol compound, a diamine compound, and an aldehyde compound in a mixed solvent of an aromatic nonpolar solvent and an alcohol.

[2]
The production method according to the above (1), comprising the steps of:
mixing the bifunctional phenol compound, the diamine compound, the aldehyde compound, and the mixed solvent to prepare a mixed solution; and
heating-treating the mixed solution.

[3]
The production method according to the above [1] or [2], wherein the diamine compound is a straight chain aliphatic diamine compound.

[4]
The production method according to the above [1] or [2], wherein the diamine compound is an aromatic diamine compound.
[5]
The production method according to any one of the above [1] to [4], wherein the proportion of the alcohol in the mixed solvent is from 5% by volume to 25% by volume.
[6]
The production method according to any one of the above [1] to [4], further comprising a step of evaporating water produced during the reaction.
[7]
The production method according to the above [6], wherein the proportion of the alcohol in the mixed solvent is from 5% by volume to 40% by volume.
[8]
The production method according to any one of the above [1] to [7], wherein the aromatic nonpolar solvent is toluene, xylene, or a mixture thereof.
[9]
The production method according to any one of the above [1] to [8], wherein the alcohol has a lower boiling point than the aromatic nonpolar solvent.
[10]
The production method according to any one of the above [1] to [9], wherein the alcohol is at least one selected from the group consisting of methanol, ethanol, 1-propanol, isopropanol, 1-butanol, 2-butanol, and isobutanol.
[11]
The production method according to any one of the above [1] to [10], wherein a monofunctional phenol compound is further added to be reacted.
[12]
The production method according to any one of the above [1] to [11], further comprising the step of: washing with a basic aqueous solution after the reaction.
[13]
A thermosetting resin having a benzoxazine ring obtained by the production method according to any one of the above [1] to [12].
[14]
The thermosetting resin having a benzoxazine ring according to the above [13], wherein a weight average molecular weight (Mw) thereof in terms of polystyrene as measured by gel permeation chromatography is 2,000 or more and 500,000 or less.

Advantages of the Invention

The present invention can provide a method for producing a thermosetting resin having a benzoxazine ring, wherein gelation of a reaction solution and insolubilization of a reaction product do not occur during the synthetic reaction and the synthetic process is easy.

Further, the present invention can provide a production method in which a thermosetting resin having a benzoxazine ring with being of high molecular weight can be obtained.

BEST MODE FOR CARRYING OUT THE INVENTION

Hereinafter, the best mode for carrying out the present invention (hereinafter referred to as embodiment) will be described in detail. Note that the present invention is not limited to the following embodiment and can be practiced by variously changing the embodiment within the scope of the gist of the present invention.

A method for producing a thermosetting resin having a benzoxazine ring according to the present embodiment is a method for producing a thermosetting resin having a benzoxazine ring comprising the step of reacting a bifunctional phenol compound, a diamine compound, and an aldehyde compound in a mixed solvent of a aromatic nonpolar solvent and an alcohol.

Examples of the bifunctional phenol compound used in the present embodiment include, but are not particularly limited to, compounds represented by following formulas (II), (III), and (IV).

The compounds represented by following formulas (II), (III), and (IV) need to have a hydrogen atom on at least one ortho position of the two ortho positions of each hydroxyl group.

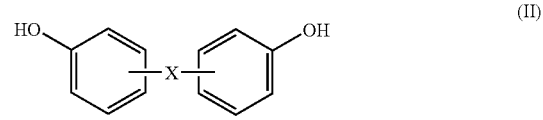
(II)

(III)

(IV)

(In formula (II), X represents a direct bond (an atom or an atomic group is not present) or an aliphatic, alicyclic or aromatic organic group which may contain a hetero element or a functional group.)

In the above formula (II), X may be bonded to a ortho position, a meta position, or a para position of each hydroxyl group. X may be substituted in the same position to each hydroxyl group or may be bonded to different positions like an ortho position and a para position.

When a hydrogen atom is present at, at least one ortho position of the two ortho positions of each hydroxyl group in the bifunctional phenol compound, other hydrogen atoms of each aromatic ring may be substituted with an aliphatic or alicyclic organic group having from 1 to 10 carbon atoms (an aliphatic hydrocarbon group or an alicyclic hydrocarbon group), or a substituted or unsubstituted phenyl group.

The bifunctional phenol compound may have an alkyl group having from 1 to 10 carbon atoms or the like as a substituent on the aromatic ring. However, it is preferred that the bifunctional phenol compound does not contain a halogen atom because the presence of halogen may reduce the insulation properties of a thermosetting resin finally obtained.

When the bifunctional phenol compound is a compound represented by the above formula (II), examples of the aliphatic, alicyclic or aromatic organic group which may contain a hetero element or a functional group as X include at least one group selected from the following group A.

Group A:

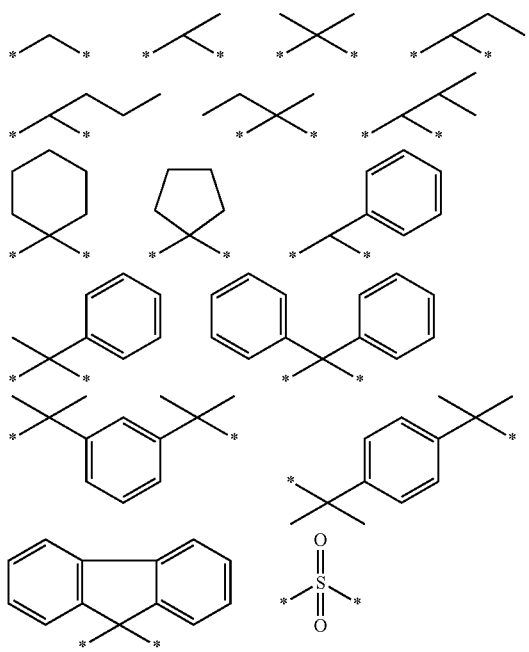

(In group A, * represents a binding site to a benzene ring in the above formula (II).)

Examples of the bifunctional phenol compound include, but are not particularly limited to, 4,4'-dihydroxydiphenyl-2,2-propane (bisphenol A), 4,4'-[1,3-phenylenebis(1-methylethylidene)]bisphenol (bisphenol M), 4,4'-[1,4-phenylenebis(1-methyl-ethylidene)]bisphenol (bisphenol P), 4,4'-methylenediphenol (bisphenol F), bis(4-hydroxyphenyl) sulfone (bisphenol S), 4,4'-biphenol, 1,5-dihydroxynaphthalene, 1,6-dihydroxynaphthalene, 1,7-dihydroxynaphthalene, 2,6-dihydroxynaphthalene, 2,7-dihydroxynaphthalene, 1,4-benzenediol (hydroquinone), 1,3-benzenediol (resorcinol), and 1,2-benzenediol (catechol).

In the present embodiment, the bifunctional phenol compounds may be used independently or in combination of two or more thereof.

Use of a bifunctional phenol compound is expected to increase the proportion of a thermosetting resin having a benzoxazine ring obtained after the synthesis which maintains a linear state. As a result, there is a tendency of improvement in the flexibility and heat resistance of a final product such as a film obtained after curing.

Examples of the diamine compound used in the present embodiment include, but are not particularly limited to, compounds represented by following formula (V).

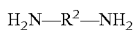   Formula (V)

wherein $R^2$ represents an aliphatic, alicyclic or aromatic organic group having from 2 to 30 carbon atoms which may contain a hetero element.

The diamine compound may have an alkyl group or the like as a substituent. However, it is preferred that the diamine compound does not contain a halogen atom because the presence of halogen may reduce the insulation properties of a thermosetting resin finally obtained.

Examples of the compound represented by the above formula (V) include, but are not particularly limited to, compounds represented by the following formulas (VI), (VII), and (VIII), for example, when $R^2$ is art aromatic organic group.

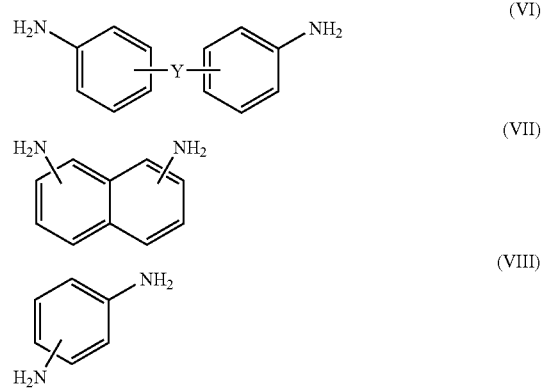

(In formula (VI), Y represents a direct bond (an atom or an atomic group is not present) or an aliphatic, alicyclic or aromatic organic group which may contain a hetero element or a functional group.)

In the diamine compound, hydrogen of each aromatic ring may be substituted with an aliphatic hydrocarbon group or alicyclic hydrocarbon group having 1 to 10 carbon atoms, or a substituted or unsubstituted phenyl group.

When the diamine compound is a compound represented by the above formula (VI), examples of the aliphatic, alicyclic or aromatic organic group which may contain a hetero element or a functional group as Y include at least one group selected from the following group B.

Group B:

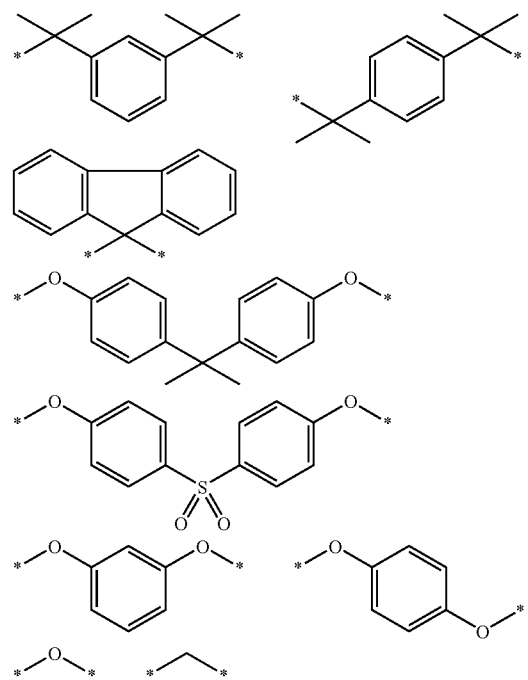

(In group B, * represents a binding site to a benzene ring in the above formula (VI).)

Examples of the compound represented by the above formula (V) include, but are not particularly limited to, at least one compound selected from the following group C and group D, when $R^2$ is an aliphatic or alicyclic organic group having 2 to 30 carbon atoms.

Group C:

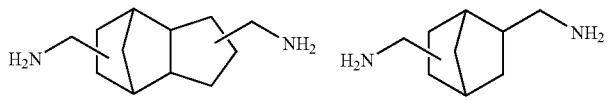

Group D:

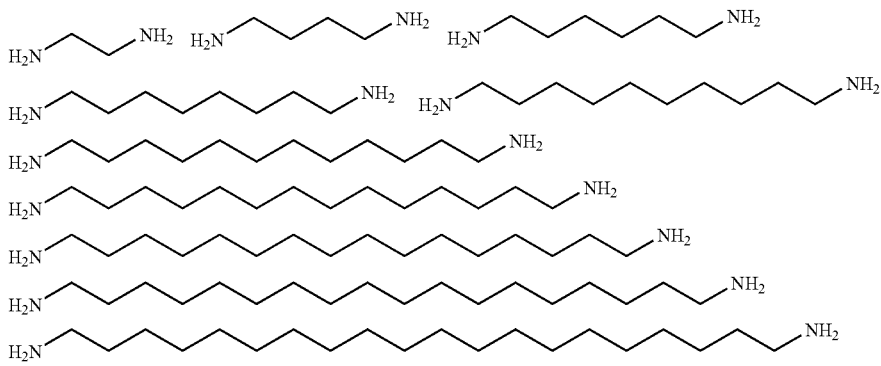

Examples of the diamine compound include, but are not particularly limited to, aromatic diamine compounds such as 1,4-diaminobenzene, 4,4'-methylenedianiline, 4,4'-methylenedi-o-toluidine, 4,4'-diaminodiphenyl ether, 2,2'-bis[4-(4-aminophenoxy)phenyl]propane (product name: BAPP, manufactured by Wakayama Seika Kogyo Co., Ltd.), 4,4'-[1, 3-phenylenebis(1-methyl-ethylidene)]bisaniline (bisaniline M), 4,4'-[1,4-phenylenebis(1-methyl-ethylidene)]bisaniline (bisaniline P), 1,3-bis(4-aminophenoxy)benzene, and 1,4-bis (4-aminophenoxy) benzene; alicyclic diamine compounds such as 3(4),8(9)-bis(aminomethyl)tricyclo[5,2,1,0$^{2,6}$]decane (product name: TCD-Diamine, manufactured by Oxcea Corporation), and 2,5(6)-bis(aminomethyl)bicyclo[2.2.1] heptane; and straight chain aliphatic diamine compounds such as 1,2-diaminoethane, 1,6-diaminohexane, 1,10-diaminodecane, 1,12-diaminododecane, 1,14-diaminotetradecane, and 1,18-diaminooctadecane.

In the present embodiment, the diamine compounds may be used independently or in combination of two or more thereof.

The used amount of the diamine compound is preferably from 0.9 mol to 1.2 mol based on 1.0 mol of the bifunctional phenol compound.

When the used amount of the diamine compound exceeds 1.20 mol, the reaction solution tends to gel, and when the used amount of the diamine compound is less than 0.90 mol, the unreacted bifunctional phenol compound tends to remain.

Using the diamine compound is expected to increase the proportion of a thermosetting resin having a benzoxazine ring obtained after the synthesis which maintains a linear state. As a result, there is a tendency of improvement in the flexibility and heat resistance of a final product such as a film obtained after curing.

The aldehyde compound used in the present embodiment is not particularly limited, but is preferably formaldehyde. The formaldehyde can be used in the form of paraformaldehyde which is a polymer thereof or formalin which is an aqueous solution thereof.

The used amount of the aldehyde compound is preferably from 4.0 mol to 6.5 mol based on 1.0 mol of the diamine compound.

When the used amount of the aldehyde compound exceeds 6.5 mol, the remaining aldehyde compound tends to give heavy load to a human body and environment. When the used amount of the aldehyde compound is less than 4.0 mol, the thermosetting resin having a benzoxazine ring tends not to have a high molecular weight.

In the production method of the thermosetting resin having a benzoxazine ring according to the present embodiment, a monofunctional phenol compound may be added for reaction together with the bifunctional phenol compound.

When the monofunctional phenol compound is used in combination, a polymer in which a reactive end is sealed with a benzoxazine ring will be produced. As a result, the molecular weight during the synthetic reaction can be controlled, and the gelation of the solution can be prevented. The sealing of the reactive end improves storage stability of the resulting thermosetting resin having a benzoxazine ring, which prevents insolubilization thereof.

Examples of the monofunctional phenol compounds include, but are not particularly limited to, phenol, o-cresol, m-cresol, p-cresol, p-tert-butylphenol, p-octylphenol, p-cumylphenol, dodecylphenol, o-phenylphenol, p-phenylphenol, 1-naphthol, 2-naphthol, m-methoxyphenol, p-methoxyphenol, m-ethoxyphenol, p-ethoxyphenol, dimethylphenol, and 3,5-dimethylphenol.

Phenol is preferred as a monofunctional phenol compound in terms of general-purpose properties and cost.

The used amount of the monofunctional phenol compound is preferably 0.50 mol or less based on 1.00 mol of the bifunctional phenol compound.

When the used amount of the monofunctional phenol compound exceeds 0.50 mol based on 1.00 mol of the bifunctional phenol compound, there is a tendency that the molecular weight of the thermosetting resin having a benzoxazine ring structure does not increase during the synthetic reaction and a large amount of monofunctional phenol compound remains.

Examples of the armotic nonpolar solvent used in the present embodiment include, but are not particularly limited to, benzene, toluene, xylene, pseudocumene, and mesitylene.

Among them, toluene and xylene are preferred and toluene is more preferred because of a small load to environment and a human body, high general-purpose properties, and a low cost.

The aromatic nonpolar solvent may be used independently or in combination of two or more thereof.

In the present embodiment, the aromatic nonpolar solvent is preferably a solvent which does not have halogen in the structure thereof or a solvent which does not contain halogen as so called an impurity. If halogen is contained or mixed in the solvent, halogen may be contained in a thermosetting resin having a benzoxazine ring obtained by the production method according to the present embodiment or in a final product such as a film. As a result, ion migration may be induced to cause reduction in the insulation properties to reduce the quality of a final product such as a film.

The alcohol used in the present embodiment is not particularly limited, but it is preferred to use an alcohol having a lower boiling point than the aromatic nonpolar solvent from a viewpoint of facilitating heat treatment to be described below.

Examples of the alcohol include, but are not particularly limited to, an alcohol having 4 or less carbon atoms, preferably methanol, ethanol, 1-propanol, isopropanol, 1-butanol, 2-butanol, and isobutanol.

The alcohol may be used independently or in combination of two or more thereof.

The alcohol has an effect to suppress rapid progress of the synthetic reaction of the thermosetting resin having a benzoxazine ring according to the solvation thereof. In the present embodiment, it is possible to reduce the possibility of gelation of the reaction solution and insolubilization of the thermosetting resin having a benzoxazine ring which is a synthesized product due to the rapid progress of the synthetic reaction of the thermosetting resin having a benzoxazine ring by using a mixed solvent of the aromatic nonpolar solvent and the alcohol.

In the present embodiment, it is possible to significantly reduce the amount of halogen in the resulting thermosetting resin having a benzoxazine ring by reacting the bifunctional phenol compound, the diamine compound, and the aldehyde compound in a mixed solvent of an aromatic nonpolar solvent containing no halogen and an alcohol containing no halogen.

The method for producing the thermosetting resin having a benzoxazine ring according to the present embodiment is preferably a method for producing a thermosetting resin having a benzoxazine ring comprising the steps of:
(a) adding and mixing the bifunctional phenol compound, the diamine compound, the aldehyde compound, and the mixed solvent to prepare a mixed solution; and
(b) heating-treating the mixed solution.

[Step (a)]

The step (a) is a step of adding and mixing the aromatic nonpolar solvent, the alcohol, the bifunctional phenol compound, the diamine compound, and the aldehyde compound to prepare a mixed solution.

In the present embodiment, the proportion of the alcohol in the mixed solvent composed of the aromatic nonpolar solvent and the alcohol is preferably in, but is not particularly limited to, the range from 5% by volume to 25% by volume based on the total mixed solvent, when a step of (c) evaporating water produced, described below, is not further included.

When the proportion of the alcohol is less than 5% by volume, the reaction suppression effect by the alcohol will be decreased, and there may be an increased risk of the gelation of the reaction solution and insolubilization of the thermosetting resin having a benzoxazine ring which is a synthesized product. When the proportion of the alcohol exceeds 25% by volume, the synthetic reaction of the thermosetting resin having a benzoxazine ring will require a long time, and the synthetic efficiency may be reduced.

In the present embodiment, the amount of the mixed solvent obtained by adding the amount of the aromatic nonpolar solvent and the alcohol is preferably such an amount that the molar concentration of the bifunctional phenol compound is from 0.1 mol/L to 1.2 mol/L based on the bifunctional phenol compound. When the molar concentration of the bifunctional phenol compound is less than 0.1 mol/L, the raw material concentration in the mixed solvent will be low, which may reduce the rate of the synthetic reaction of the thermosetting resin having a benzoxazine ring to reduce the synthetic efficiency thereof. When the molar concentration of the bifunctional phenol compound exceeds 1.2 mol/L, there may be an increased risk of the gelation of the reaction solution and insolubilization of the thermosetting resin having a benzoxazine ring which is a synthesized product during the synthetic reaction of the thermosetting resin having a benzoxazine ring.

The order of adding and mixing the raw materials is not particularly limited, but it is preferred to successively and collectively add and mix the bifunctional phenol compound, the diamine compound, and the aldehyde compound with the mixed solvent of the aromatic nonpolar solvent and the alcohol. For an efficient mixing and dissolution of the raw materials, the bifunctional phenol compound and other compounds may be added and mixed with the mixed solution with stirring suitably using a stirrer, a stirring bar, or the like.

[Step (b)]

The step (b) is a step of heating-treating the mixed solution prepared in the step (a) described above.

An example of the heat treatment method includes, but is not particularly limited to, a method in which the mixed solution is increased to a predetermined temperature at a stroke using a temperature controller such as an oil bath and then the temperature is kept constant.

The predetermined temperature at the heat treatment is not particularly limited as long as it is the temperature at which the increase in efficiency of the synthetic reaction of the thermosetting resin having a benzoxazine ring is achieved. It is preferred that reaction solution temperature is controlled, for example, in the range of from 50° C. to 130° C.

When the reaction solution temperature is less than 50° C., the synthetic reaction of the thermosetting resin having a benzoxazine ring may be reduced, and the synthetic efficiency may be reduced. When reaction solution temperature exceeds 130° C., there may be an increased risk of the gelation of the reaction solution and insolubilization of the thermosetting resin having a benzoxazine ring which is a synthesized product at the time of the synthetic reaction of the thermosetting resin having a benzoxazine ring.

The mixed solvent may be refluxed while the mixed solution is heat-treated.

[Step (c)]

The production method of the thermosetting resin having a benzoxazine ring according to the present embodiment may further comprise a step of (c) evaporating water produced.

In the present embodiment, it is possible to decrease the time required for the synthetic reaction of the thermosetting resin having a benzoxazine ring by evaporating water produced in the reaction, thereby capable of achieving the increase in the efficiency of the reaction.

The evaporating of water produced is not particularly limited and can be performed by azeotropically evaporation of the water with the mixed solvent in the reaction solution. The water produced can be evaporated, for example, by using an isobaric dropping funnel with a cock, a Dimroth condenser, a Dean-Stark device, and the like.

When the production method of the thermosetting resin having a benzoxazine ring according to the present embodiment further comprises the step (c), the proportion of the alcohol in the mixed solvent is preferably from 5% by volume to 40% by volume based on the total mixed solvent. When the proportion of the alcohol is less than 5% by volume, the reaction suppression effect by the alcohol will be reduced, and there may be an increased risk of the gelation of the reaction solution and insolubilization of the thermosetting resin having a benzoxazine ring which is a synthesized product. When the proportion of the alcohol exceeds 40% by volume, the time to evaporate the alcohol may be increased to reduce the synthetic efficiency of the thermosetting resin having a benzoxazine ring.

The duration of the heat treatment is not particularly limited and is preferably, for example, from about 1 hour to about 10 hours after the heating is started. After continuing the heating for from 1 hour to 10 hours from the start of the heating, the reaction solution is removed from the contact with a temperature controller such as an oil bath and may be allowed to cool or may be cooled using a refrigerant or the like.

[Step (d)]

The production method of the thermosetting resin having a benzoxazine ring according to the present embodiment may further comprise a step of (d) washing with a basic aqueous solution after the reaction.

The method further comprising the step (d) allows removal of the unreacted bifunctional and monofunctional phenol compounds from the reaction solution.

It is also possible to remove ions derived from the basic aqueous solution such as sodium ions by the washing with the basic aqueous solution in the step (d) followed by washing several times with distilled water or the like.

The basic aqueous solution is not particularly limited as long as it is an aqueous solution prepared by dissolving a basic compound in water. Examples of the basic compound include, but are not limited to, sodium hydroxide, potassium hydroxide, and calcium hydroxide.

Sodium hydroxide is preferred as a basic compound from the viewpoint of the general-purpose properties thereof.

The concentration of the basic aqueous solution is preferably from 0.01 mol/L to 0.1 mol/L. When the concentration of the basic aqueous solution is less than 0.01 mol/L, there is a tendency that it is difficult to sufficiently remove the unreacted bifunctional and monofunctional phenol compounds. When the concentration of the basic aqueous solution exceeds 0.1 mol/L, there is a tendency that when the reaction solution is washed with the basic aqueous solution, these solutions form an emulsion without being separated into a basic aqueous solution layer and a reaction solution layer.

The used amount of the basic aqueous solution is not particularly limited, but is preferably from 0.5 times to 5.0 times the volume of the reaction solution. When the used amount of the basic aqueous solution is less than 0.5 times the volume of the reaction solution, there is a tendency that it is difficult to sufficiently remove the unreacted bifunctional and monofunctional phenol compounds. When the used amount of the basic aqueous solution exceeds 5.0 times the volume of the reaction solution, the removal of the basic aqueous solution layer takes more time than expected and thereby reducing the efficiency of operation. Further, the amount of waste fluid to be treated increases, which is not preferred in terms of the load on environment.

The washing of the reaction solution by the basic aqueous solution is not particularly limited, and it can be performed, for example, by filling a separating funnel or the like with the basic aqueous solution and the reaction solution followed by shaking the separating funnel about 10 times so that these solutions can be mixed. The resulting mixture can be separated into a reaction solution layer and a basic aqueous solution layer by allowing the separating funnel to stand.

Alternatively, after the reaction solution is cooled, the reaction solution can be washed with the basic aqueous solution by adding it to the reaction solution in the reactor followed by stirring, and the resulting mixture can be allowed to stand to separate the reaction solution into a reaction solution layer and a basic aqueous solution.

The frequency of washing by the basic aqueous solution is not particularly limited as long as it is once or more.

After the washing with the basic aqueous solution, the reaction solution is preferably washed with distilled water, purified water, or the like in order to remove the ions derived from the basic aqueous solution.

The washing with water is not particularly limited as long as the ions derived from the basic aqueous solution can be removed, but the washing is preferably performed once or more, more preferably twice or more.

Examples of the method for recovering the thermosetting resin having a benzoxazine ring synthesized from the reaction solution include, but are not limited to, reprecipitation by a poor solvent, solidification by concentration (evaporating solvent under reduced pressure), and spray-drying.

Since the thermosetting resin having a benzoxazine ring obtained by the production method of the thermosetting resin having a benzoxazine ring according to the present embodiment has a high molecular weight, it is possible to expect an improvement in physical properties such as heat resistance and flexibility of a final product such as a film obtained by subsequent ring opening reaction.

The thermosetting resin having a benzoxazine ring with being of high molecular weight in the present embodiment refers to a thermosetting resin with high molecular weight in which the ring opening reaction of the benzoxazine ring proceeds competitively, and the molecular weight of the thermosetting resin has increased without forming a three-dimensional crosslinking structure while maintaining a prepolymer type benzoxazine compound, i.e. a structure having a benzoxazine ring as a repeating unit.

A weight average molecular weight (Mw) of the thermosetting resin having a benzoxazine ring according to the present embodiment is preferably 2,000 or more and 500,000 or less, more preferably 4,000 or more and 200,000 or less in terms of polystyrene as measured by gel permeation chromatography.

When the Mw is less than 2,000, there is a tendency that the heat resistance and flexibility of the final product obtained by subsequent ring opening reaction is reduced, and the efficiency of the recovery operation of the synthesized thermosetting resin having a benzoxazine ring is reduced.

In the present embodiment, the thermosetting resin having a benzoxazine ring which has a desired Mw can be obtained by sampling part of the reaction solution during the synthetic reaction and subjecting the sample to a gel permeation chromatography measurement to identify the Mw.

In the present embodiment, the weight average molecular weight (Mw) can be measured by the method described in the following Examples.

The thermosetting resin having a benzoxazine ring according to the present embodiment is produced using a mixed solvent having no halogen in the structure or containing no halogen as what is called an impurity. Therefore, it is possible to obtain a high molecular weight thermosetting resin containing no halogen.

The thermosetting resin having a benzoxazine ring according to the present embodiment preferably has a halogen content determined by a quantitative analysis described in the following Examples of 100 ppm or less, more preferably 10 ppm or less.

To the thermosetting resin having a benzoxazine ring according to the present embodiment may be optionally added a curing accelerator, a flame retardant, an inorganic filler, a release agent, an adhesion-imparting agent, a surfactant, a colorant, a coupling agent, a leveling agent, another thermosetting resin, and the like to form a thermosetting resin composition.

In the present embodiment, it is possible to obtain a composition of a thermosetting resin having a benzoxazine ring which does not gel and contains no halogen.

The composition of the thermosetting resin having a benzoxazine ring may contain the mixed solvent.

The composition of the thermosetting resin composition having a benzoxazine ring can be subjected to ring opening reaction for suitable use as an electronic material such as a laminate sheet and a semiconductor sealing material and a binder for a friction material, a grinding stone, and the like.

EXAMPLES

The present embodiment will be more specifically described below in accordance with Examples and Comparative Examples, but the present invention is not limited only to these Examples. Note that the evaluation methods and measuring methods used for the present Examples are as follows.
[Determination of Weight Average Molecular Weight (Mw)]
A high-speed liquid chromatograph system (manufacturer: SHIMADZU) was used, including the following:
System controller: SCL-10A VP
Liquid feed unit: LC-10AD
VP degasser: DGU-12A
Differential refractometer (RI) detector: RID-10A
Auto injector: SIL-10AD VP
Column oven: CTO-10AS VP
Column: SHODEX KF804L (exclusion limit molecular weight 400,000)×2 (series)
Column temperature: 40° C.
Flow rate: 1 ml/min
Eluate: THF (for HPLC, containing no stabilizer, manufactured by Wako Pure Chemical Industries, Ltd.)
Sample: 0.7% by mass
Detector: RI
A calibration curve was prepared using standard polystyrene having an Mw (Mw/Mn) of 354,000 (1.02), 189,000 (1.04), 98,900 (1.01), 37,200 (1.01), 17,100 (1.02), 9,830 (1.02), 5,870 (1.05), 2,500 (1.05), 1,050 (1.13), 500 (1.14), and 300 (1.20), respectively.

A weight average molecular weight (Mw) in terms of polystyrene as measured by gel permeation chromatography was measured in terms of standard polystyrene.

Example 1

To a 500-mL flask equipped with a reflux tube, an isobaric dropping funnel with a cock and a Dimroth condenser were added and mixed 150 mL of toluene (manufactured by Wako Pure Chemical Industries, Ltd.) and 50 mL of methanol (manufactured by Wako Pure Chemical Industries, Ltd.) as a mixed solvent collectively at room temperature. Then, to the flask were added 15.98 g (0.07 mol) of bisphenol A (manufactured by GE Plastics Japan Ltd.) and 8.14 g (0.07 mol) of 1,6-diaminohexane (manufactured by Toray Industries, Inc.) collectively at room temperature, followed by mixing. Then, to the flask was added 9.63 g (0.29 mol) of paraformaldehyde (91.60%, manufactured by Mitsubishi Gas Chemical Company, Inc.) collectively at room temperature, followed by mixing to obtain a mixed solution in which all the raw materials were mixed.

The flask containing the mixed solution was immersed in an oil bath at a temperature of 80° C. to heat the mixed solution to allow the reaction to proceed. After one hour from the start of reflux, the water produced during the reaction was azeotropically removed with toluene and methanol.

After allowing the reaction to proceed for 4 hours from the start of the removal, the flask was removed from the oil bath to cool the resulting reaction solution to room temperature. The resulting reaction solution was poured into 1 L of methanol (manufactured by Wako Pure Chemical Industries, Ltd.) to precipitate a reaction product. The white precipitated solid was dried under reduced pressure to obtain a white powdered thermosetting resin having a benzoxazine ring.

The obtained thermosetting resin having a benzoxazine ring had a weight average molecular weight (Mw) of 5,495 in terms of polystyrene as measured by gel permeation chromatography.

Example 2

A mixed solution in which all the raw materials are mixed was obtained in the similar manner as in Example 1 except that the mixed solvent was replaced by 300 mL of toluene and 75 mL of methanol. The flask containing the mixed solution was immersed in an oil bath at a temperature of 80° C. to heat the mixed solution to allow the reaction to proceed. After one hour from the start of reflux, the water produced during the reaction was azeotropically removed with toluene and methanol. After allowing the reaction to proceed for 5.5 hours from the start of the removal, the flask was removed from the oil bath to cool the resulting reaction solution to room temperature. The resulting reaction solution was poured into 2 L of methanol to precipitate a reaction product. The white precipitated solid was dried under reduced pressure to obtain a white powdered thermosetting resin having a benzoxazine ring.

The obtained thermosetting resin having a benzoxazine ring had an Mw of 5,781.

Example 3

A mixed solution in which all the raw materials are mixed was obtained in the similar manner as in Example 1 except that the mixed solvent was replaced by 150 mL of toluene and 75 mL of ethanol (manufactured by Wako Pure Chemical Industries, Ltd.). The flask containing the mixed solution was immersed in an oil bath at a temperature of 90° C. to heat the mixed solution to allow the reaction to proceed. After 4 hours from the start of reflux, the water produced during the reaction was azeotropically removed with toluene and ethanol. After allowing the reaction to proceed for 5 hours from the start of the removal, the flask was removed from the oil bath to cool the resulting reaction solution to room temperature. The resulting reaction solution was poured into 1 L of methanol to precipitate a reaction product. The white precipitated solid was dried under reduced pressure to obtain a white powdered thermosetting resin having a benzoxazine ring.

The obtained thermosetting resin having a benzoxazine ring had an Mw of 4,307.

Example 4

To a 250-mL flask equipped with a reflux tube, an isobaric dropping funnel with a cock and a Dimroth condenser were added and mixed 35 mL of toluene and 150 ml of isobutanol (manufactured by Mitsubishi Chemical Corporation) as a mixed solvent collectively at room temperature. Then, to the flask were added 3.17 g (0.014 mol) of bisphenol A, 1.45 g (0.007 mol) of 1,12-diaminododecane (manufactured by Kokura Synthetic Industries, Ltd.) and 1.37 g (0.007 mol) of TCD-Diamine (manufactured by OXEA Corporation) collectively at room temperature, followed by mixing. Then, to the flask was added 1.83 g (0.056 mol) of paraformaldehyde (91.60%) collectively at room temperature, followed by mixing to obtain a mixed solution in which all the raw materials were mixed.

The flask containing the mixed solution was immersed in an oil bath at a temperature of 120° C. to heat the mixed solution to allow the reaction to proceed. After 4 hours from the start of reflux, the water produced during the reaction was azeotropically removed with toluene and isobutanol.

After allowing the reaction to proceed for 4 hours from the start of the removal, the flask was removed from the oil bath to cool the resulting reaction solution to room temperature. The resulting reaction solution was poured into 100 mL of methanol to precipitate a reaction product. The white precipitated solid was dried under reduced pressure to obtain a white powdered thermosetting resin having a benzoxazine ring.

The obtained thermosetting resin having a benzoxazine ring had an Mw of 23,209.

Example 5

To a 50-mL flask equipped with a reflux tube, an isobaric dropping funnel with a cock and a Dimroth condenser were added and mixed 16 mL of toluene and 4 mL of isobutanol as a mixed solvent collectively at room temperature. Then, to the flask were added 1.37 g (0.006 mol) of bisphenol A and 0.70 g (0.006 mol) of 1,6-diaminohexane collectively at room temperature, followed by mixing. Then, to the flask was added 0.83 g (0.025 mol) of paraformaldehyde (91.60%) collectively at room temperature, followed by mixing to obtain a mixed solution in which all the raw materials were mixed.

The flask containing the mixed solution was immersed in an oil bath at a temperature of 120° C. to heat the mixed solution to allow the reaction to proceed.

After allowing the reaction to proceed for 6 hours from the start of reflux, the flask was removed from the oil bath to cool the resulting reaction solution to room temperature. The resulting reaction solution was poured into 100 mL of methanol to precipitate a reaction product. The white precipitated solid was dried under reduced pressure to obtain a white powdered thermosetting resin having a benzoxazine ring.

The obtained thermosetting resin having a benzoxazine ring had an Mw of 11,555.

Example 6

To a 10-L reactor equipped with a reflux tube, an isobaric dropping funnel with a cock and a Dimroth condenser were added and mixed 2,550 mL of toluene and 450 mL of isobutanol as a mixed solvent collectively at room temperature. Then, to the flask were added 274.00 g (1.20 mol) of bisphenol A, 136.33 g (0.66 mol) of 1,12-diaminododecane, 129.18 g (0.66 mol) of TCD-Diamine and 34.22 g (0.36 mol) of phenol (manufactured by Wako Pure Chemical Industries, Ltd.) collectively at room temperature, followed by mixing. Then, to the flask was added 259.50 g (7.92 mol) of paraformaldehyde (91.60%) collectively at room temperature, followed by mixing to obtain a mixed solution in which all the raw materials were mixed.

The mixed solution was heated to 100° C. to allow the reaction to proceed while nitrogen gas was purged into the system at a flow rate of 15 mL/min. After refluxing for 6 hours, the resulting reaction solution was cooled to room temperature. The amount of phenol remaining in the reaction solution at this time was 1.2% based on the thermosetting resin having a benzoxazine ring.

The reaction solution was washed twice with 3 L of 0.03 mol/L aqueous sodium hydroxide and then twice with 3 L of distilled water. The amount of phenol remaining in the reaction solution at this time was 0.1% based on the thermosetting resin having a benzoxazine ring.

The resulting reaction solution was poured into 15 L of methanol to precipitate a reaction product. The white precipitated solid was dried under reduced pressure to obtain a white powdered thermosetting resin having a benzoxazine ring.

The obtained thermosetting resin having a benzoxazine ring had an Mw of 7,811.

Example 7

To a 500-mL flask equipped with a reflux tube, an isobaric dropping funnel with a cock and a Dimroth condenser were added and mixed 90 mL of toluene and 10 mL of isobutanol as a mixed solvent collectively at room temperature. Then, to the flask were added 34.67 g (0.10 mol) of bisphenol M (manufactured by Mitsui Chemicals, Inc.) and 34.40 g (0.10 mol) of bisaniline M (manufactured by Mitsui Chemicals, Inc.) collectively at room temperature, followed by mixing. Then, the reaction solution was heated to 65° C. to verify the dissolution of bisphenol M and bisaniline M and then 13.71 g (0.42 mol) of paraformaldehyde (91.60%) was collectively adding to the flask followed by mixing.

The flask containing the mixed solution was heated to 110° C. to allow the reaction to proceed. After 2 hours from the start of reflux, the water produced during the reaction was azeotropically removed with toluene and isobutanol. The reaction was allowed to proceed under reflux for 4 hours from the start of the removal. Then, the resulting reaction solution was cooled to room temperature. The resulting reaction solution was diluted with 100 mL of toluene, filtered, and then poured into 1 L of methanol to precipitate a reaction product. The white precipitated solid was dried under reduced pressure to obtain a white powdered thermosetting resin having a benzoxazine ring.

The obtained thermosetting resin having a benzoxazine ring had an Mw of 7,073.

Example 8

To a 10-L reactor equipped with a reflux tube, an isobaric dropping funnel with a cock and a Dimroth condenser were added and mixed 1,900 mL of toluene and 100 mL of isobutanol as a mixed solvent collectively at room temperature. Then, to the flask were added 416.31 g (1.20 mol) of bisphenol M, 513.05 g (1.248 mol) of BAPP (manufactured by Wakayama Seika Kogyo Co., Ltd.) and 9.13 g (0.096 mol) of phenol collectively at room temperature, followed by mixing. Then, the reaction solution was heated to 65° C. to verify the dissolution of each raw material and then 196.28 g (5.99 mol) of paraformaldehyde (91.60%) was collectively added to the flask followed by mixing.

The mixed solution was heated to 110° C. to allow the reaction to proceed while nitrogen gas was purged into the system at a flow rate of 15 mL/min. After 2 hours from the start of reflux, the water produced during the reaction was azeotropically removed with toluene and isobutanol. The reaction was allowed to proceed under reflux for 6 hours from the start of the removal. Then, the resulting reaction solution was cooled to room temperature. The resulting reaction solution was diluted with 1,800 mL of toluene, filtered, and then poured into 15 L of methanol to precipitate a reaction product. The white precipitated solid was dried under reduced pressure to obtain a white powdered thermosetting resin having a benzoxazine ring.

The obtained thermosetting resin having a benzoxazine ring had an Mw of 16,228.

Example 9

To a 500-mL flask equipped with a reflux tube, an isobaric dropping funnel with a cock and a Dimroth condenser were added and mixed 190 mL of toluene and 10 mL of isobutanol as a mixed solvent collectively at room temperature. Then, to the flask were added 48.57 g (0.14 mol) of bisphenol M, 37.63 g (0.109 mol) of bisaniline M, 7.31 g (0.036 mol) of 1,12-diaminododecane and 1.06 g (0.011 mol) of phenol collectively at room temperature, followed by mixing. Then, the reaction solution was heated to 65° C. to verify the dissolution of each raw material and then 24.33 g (0.74 mol) of paraformaldehyde (91.60%) was collectively added to the flask followed by mixing.

The mixed solution was heated to 110° C. to allow the reaction to proceed. After 2 hours from the start of reflux, the water produced during the reaction was azeotropically removed with toluene and isobutanol. The reaction was allowed to proceed under reflux for 5 hours from the start of the removal. Then, the resulting reaction solution was cooled to room temperature. The resulting reaction solution was diluted with 210 ml of toluene and filtered to obtain a white powdered thermosetting resin having a benzoxazine ring by using a spray-dryer.

The obtained thermosetting resin having a benzoxazine ring had an Mw of 17,031.

Example 10

The thermosetting resin having a benzoxazine ring obtained in Example 1 was quantitatively analyzed for Cl (total chlorine) by an automatic combustion halogen/sulfur analysis system using an SQ-1 type/HSU-35 type manufactured by Yanaco + an ICP-2000 type manufactured by Dionex Corporation.

A measuring sample was burned in a heated quartz combustion tube with introducing clean air. A produced combustion gas was absorbed and captured in an absorption unit (HSU-35 type) and collected as a measuring liquid. The measuring liquid was subjected to fractional determination of halogen and sulfur in an ion chromatograph to measure the content thereof in the Measuring sample.

The content of Cl in the thermosetting resin having a benzoxazine ring in Example 1 was less than 10 ppm.

Comparative Example 1

To a 500-mL flask was added 200 mL of cyclohexanone (manufactured by Wako Pure Chemical Industries, Ltd.) collectively at room temperature. Then, to the flask were added 15.98 g (0.07 mol) of bisphenol A, 4.07 g (0.035 mol) of 1,6-diaminohexane, and 6.86 g (0.035 mol) of TCD-Diamine collectively at room temperature, followed by mixing. Then, to the flask was added 9.63 g (0.29 mol) of paraformaldehyde (91.60%) collectively at room temperature, followed by mixing to obtain a mixed solution in which all the raw materials were mixed.

The flask containing the mixed solution was immersed in an oil bath at a temperature of 70° C. to heat the mixed solution to allow the reaction to proceed. The production of a high molecular weight thermosetting resin having a benzoxazine ring was not able to be identified from the mixed solution even after the lapse of 5 hours. Therefore, the reaction was interrupted.

Comparative Example 2

A mixed solution in which all the raw materials are mixed was obtained in the similar manner as in Comparative Example 1 except that 200 mL of cyclohexanone was replaced by 200 mL of dimethylacetamide (manufactured by Wako Pure Chemical Industries, Ltd.).

The flask containing the mixed solution was immersed in an oil bath at a temperature of 70° C. to heat the mixed solution to allow the reaction to proceed. The production of a thermosetting resin having a benzoxazine ring was not able to be identified from the mixed solution even after the lapse of 5 hours. Therefore, the reaction was interrupted.

Comparative Example 3

A mixed solution in which all the raw materials are mixed was obtained in the similar manner as in Comparative Example 1 except that 200 mL of cyclohexanone was replaced by 200 mL of toluene.

The flask containing the mixed solution was immersed in an oil bath at a temperature of 70° C. to heat the mixed solution to allow the reaction to proceed. The reaction Solution gelled after the lapse of 2 hours from the start of the reaction. Therefore, the reaction was interrupted.

Comparative Example 4

A mixed solution in which all the raw materials are mixed was obtained in the similar manner as in Comparative Example 1 except that 200 mL of cyclohexanone was replaced by 200 mL of toluene, and 4.07 g (0.035 mol) of 1,6-diaminohexane and 6-86 g (0.035 mol) of TCD-Diamine were replaced by 8.14 g (0.07 mol) of 1,6-diaminohexane.

The flask containing the mixed solution was immersed in an oil bath at a temperature of 70° C. to heat the mixed solution to allow the reaction to proceed. The reaction solution gelled after the lapse of 1 hour from the start of the reaction. Therefore, the reaction was interrupted.

Comparative Example 5

To a 500-mL flask equipped with a reflux tube, an isobaric dropping funnel with a cock and a Dimroth condenser were added and mixed 155 mL of toluene and 65 mL of acetone (manufactured by Wako Pure Chemical Industries, Ltd.) collectively at room temperature. Then, to the flask were added 15.98 g (0.07 mol) of bisphenol A and 8.14 g (0.07 mol) of 1,6-diaminohexane collectively at room temperature, followed by mixing. Then, to the flask was added 9.63 g (0.29 mol) of paraformaldehyde (91.60%) collectively at room temperature, followed by mixing to obtain a mixed solution in which all the raw materials were mixed.

The flask containing the mixed solution was immersed in an oil bath at a temperature of 85° C. to heat the mixed solution to allow the reaction to proceed. The reaction solution gelled after 1 hour from the start of reflux. Therefore, the reaction was interrupted.

Comparative Example 6

Preparation of the raw material and the reaction were performed in the similar manner as in Comparative Example 5 except that the evaporation of a volatile constituent was started simultaneously with the start of refluxing. The solution gelled one hour after the start of evaporation. Therefore, the reaction was interrupted.

Comparative Example 7

To a 500-mL flask equipped with a reflux tube, an isobaric dropping funnel with a cock and a Dimroth condenser were added and mixed 140 mL of toluene and 75 mL of tetrahydrofuran (THF) collectively at room temperature. Then, to the flask were added 15.98 g (0.07 mol) of bisphenol A and 8.14 g (0.07 mol) of 1,6-diaminohexane collectively at room temperature followed by mixing. Then, to the flask was added 9.63 g (0.29 mol) of paraformaldehyde (91.60%) collectively at room temperature, followed by mixing to obtain a mixed solution in which all the raw materials were mixed.

The flask containing the mixed solution was immersed in an oil bath at a temperature of 95° C. to heat the mixed solution to allow the reaction to proceed. The reaction was allowed to proceed for 6 hours from the start of refluxing, but the production of a thermosetting resin having a benzoxazine ring with high molecular weight was not able to be identified. Therefore, the reaction was interrupted.

Comparative Example 8

Preparation of the raw material and the reaction were performed in the similar manner as in Comparative Example 7 except that the evaporation of a volatile constituent was started simultaneously with the start of refluxing. The reaction was allowed to proceed for 6 hours from the start of evaporation, but the production of a thermosetting resin having a benzoxazine ring with high molecular weight was not able to be identified. Therefore, the reaction was interrupted.

Comparative Example 9

To a 500-ml, flask equipped with a reflux tube, an isobaric dropping funnel with a cock and a Dimroth condenser was added 200 mL of methanol collectively at room temperature. Then, to the flask were added 15.98 g (0.07 mol) of bisphenol A and 8.14 g (0.07 mol) of 1,6-diaminohexane collectively at room temperature, followed by mixing. Then, to the flask was added 9.63 g (0.29 mol) of paraformaldehyde (91.60%) collectively at room temperature, followed by mixing to obtain a mixed solution in which all the raw materials were mixed.

The flask containing the mixed solution was immersed in an oil bath at a temperature of 80° C. to heat the mixed solution to allow the reaction to proceed. The reaction was allowed to proceed for 5 hours from the start of reflux, but the production of a thermosetting resin having a benzoxazine ring with high molecular weight was not able to be identified. Therefore, the reaction was interrupted.

Reference Synthesis Example

To a 500-mL flask equipped with a reflux tube, an isobaric dropping funnel with a cock and a Dimroth condenser was added 200 ml of chloroform (manufactured by Wako Pure Chemical Industries, Ltd.) collectively at room temperature. Then, to the flask were added 14.61 g (0.064 mol) of bisphenol A and 7.44 g (0.064 mol) of 1,6-diaminohexane collectively at room temperature, followed by mixing. Then, to the flask was added 8.59 g (0.256 mol) of paraformaldehyde (91.60%) collectively at room temperature, followed by mixing to obtain a mixed solution in which all the raw materials were mixed. The flask containing the mixed solution was immersed in an oil bath at a temperature of 75° C. to heat the mixed solution to allow the reaction to proceed. After 6 hours of the reaction from the start of reflux, the flask was removed from the oil bath to cool the resulting reaction solution to room temperature. The resulting reaction solution was poured into 1 L of methanol to precipitate a reaction product. The white precipitated solid was dried under reduced pressure to obtain a white powdered thermosetting resin having a benzoxazine ring. The obtained thermosetting resin having a benzoxazine ring had an Mw of 37,007.

The thermosetting resin having a benzoxazine ring obtained in the Reference Synthetic Example was quantitatively analyzed for Cl (total chlorine) by an automatic combustion halogen/sulfur analysis system using an SQ-1 type/HSU-35 type manufactured by Yanaco an ICP-2,000 type manufactured by Dionex Corporation, resulting in a value of 37,000 ppm.

TABLE 1

|  | Solvent type and used amount thereof | Bifunctional phenol type and used amount thereof | Monofunctional phenol and used amount thereof | Diamine type and used amount thereof |
| --- | --- | --- | --- | --- |
| Example 1 | Toluene 150 ml/Methanol 50 ml | Bisphenol A 0.07 mol | — | 1,6-Diaminohexane 0.07 mol |
| Example 2 | Toluene 300 ml/Methanol 75 ml | Bisphenol A 0.07 mol | — | 1,6-Diaminohexane 0.07 mol |
| Example 3 | Toluene 150 ml/Ethanol 75 ml | Bisphenol A 0.07 mol | — | 1,6-Diaminohexane 0.07 mol |
| Example 4 | Toluene 35 ml/Isobutanol 15 ml | Bisphenol A 0.014 mol | — | 1,12-Diaminododecane 0.007 mol TCD-Diamine 0.007 mol |
| Example 5 | Toluene 16 ml/Isobutanol 4 ml | Bisphenol A 0.006 mol | — | 1,6-Diaminohexane 0.06 mol |
| Example 6 | Toluene 2550 ml/Isobutanol 450 ml | Bisphenol A 1.20 mol | Phenol 0.36 mol | 1,12-Diaminododecane 0.66 mol TCD-Diamine 0.66 mol |
| Example 7 | Toluene 90 ml/Isobutanol 10 ml | Bisphenol M 0.10 mol | — | Bisaniline M 0.10 mol |
| Example 8 | Toluene 1900 ml/Isobutanol 100 ml | Bisphenol M 1.20 mol | Phenol 0.096 mol | BAPP 1.248 mol |
| Example 9 | Toluene 190 ml/Isobutanol 10 ml | Bisphenol M 0.14 mol | Phenol 0.011 mol | Bisaniline M 0.109 mol 1,12-Diaminododecane 0.036 mol |
| Comparative Example 1 | Cyclohexane 200 ml | Bisphenol A 0.07 mol | — | 1,6-Diaminohexane 0.035 mol TCD-Diamine 0.035 mol |

TABLE 1-continued

| | | | | |
|---|---|---|---|---|
| Comparative Example 2 | Dimethylacetamide 200 ml | Bisphenol A 0.07 mol | — | 1,6-Diaminohexane 0.035 mol<br>TCD-Diamine 0.035 mol |
| Comparative Example 3 | Toluene 200 ml | Bisphenol A 0.07 mol | — | 1,6-Diaminohexane 0.035 mol<br>TCD-Diamine 0.035 mol |
| Comparative Example 4 | Toluene 200 ml | Bisphenol A 0.07 mol | — | 1,6-Diaminohexane 0.07 mol |
| Comparative Example 5 | Toluene 155 ml/Acetone 65 ml | Bisphenol A 0.07 mol | — | 1,6-Diaminohexane 0.07 mol |
| Comparative Example 6 | Toluene 155 ml/Acetone 65 ml | Bisphenol A 0.07 mol | — | 1,6-Diaminohexane 0.07 mol |
| Comparative Example 7 | Toluene 140 ml/THF 75 ml | Bisphenol A 0.07 mol | — | 1,6-Diaminohexane 0.07 mol |
| Comparative Example 8 | Toluene 140 ml/THF 75 ml | Bisphenol A 0.07 mol | — | 1,6-Diaminohexane 0.07 mol |
| Comparative Example 9 | Methanol 200 ml | Bisphenol A 0.07 mol | — | 1,6-Diaminohexane 0.07 mol |

| | Aldehyde type and used amount thereof | Evaporation | Reaction time (hour) | Result (Mw value) |
|---|---|---|---|---|
| Example 1 | Paraformaldehyde 0.29 mol | Yes | 5 | ○ (5495) |
| Example 2 | Paraformaldehyde 0.29 mol | Yes | 6.5 | ○ (5781) |
| Example 3 | Paraformaldehyde 0.29 mol | Yes | 9 | ○ (4307) |
| Example 4 | Paraformaldehyde 0.056 mol | Yes | 8 | ○ (23209) |
| Example 5 | Paraformaldehyde 0.025 mol | No | 6 | ○ (11555) |
| Example 6 | Paraformaldehyde 7.92 mol | No | 6 | ○ (7811) |
| Example 7 | Paraformaldehyde 0.42 mol | No | 6 | ○ (7073) |
| Example 8 | Paraformaldehyde 5.99 mol | Yes | 8 | ○ (16228) |
| Example 9 | Paraformaldehyde 0.74 mol | Yes | 7 | ○ (17031) |
| Comparative Example 1 | Paraformaldehyde 0.29 mol | No | 5 | X (No production of high molecular weight product) |
| Comparative Example 2 | Paraformaldehyde 0.29 mol | No | 5 | X (No production of high molecular weight product) |
| Comparative Example 3 | Paraformaldehyde 0.29 mol | No | 2 | X (Gelation) |
| Comparative Example 4 | Paraformaldehyde 0.29 mol | No | 1 | X (Gelation) |
| Comparative Example 5 | Paraformaldehyde 0.29 mol | No | 1 | X (Gelation) |
| Comparative Example 6 | Paraformaldehyde 0.29 mol | Yes | 1 | X (Gelation) |
| Comparative Example 7 | Paraformaldehyde 0.29 mol | No | 6 | X (No production of high molecular weight product) |
| Comparative Example 8 | Paraformaldehyde 0.29 mol | Yes | 6 | X (No production of high molecular weight product) |
| Comparative Example 9 | Paraformaldehyde 0.29 mol | No | 5 | X (No production of high molecular weight product) |

From the above results, the present invention can provide a thermosetting resin having a benzoxazine ring with being of high molecular weight without gelation of a reaction solution during synthetic reaction by an easy process.

INDUSTRIAL APPLICABILITY

The present invention can provide a method for producing a thermosetting resin having a benzoxazine ring with being of high molecular weight, in which gelation of a reaction solution and insolubilization of a reaction product do not occur during synthetic reaction and a synthetic process is easy.

Since the production method according to the present invention can provide a method for producing a thermosetting resin having a benzoxazine ring with being of high molecular weight, the present invention has an industrial applicability in the field of an electronic material such as a laminate sheet and a semiconductor sealing material and a binder for a friction material, a grinding stone, and the like.

The invention claimed is:

1. A method for producing a thermosetting resin having a benzoxazine ring, comprising:
    reacting a bifunctional phenol compound, a diamine compound, and an aldehyde compound in a mixed solvent of an aromatic nonpolar solvent and an alcohol to form a polymer solution of the resin, wherein a molar ratio between the diamine compound and the bifunctional phenol compound is from 0.9 to 1.2 based on 1 mol of the bifunctional phenol, and the proportion of the alcohol in the mixed solvent is from 5% by volume to 40% by volume.

2. The production method according to claim 1, comprising:
    mixing the bifunctional phenol compound, the diamine compound, the aldehyde compound, and the mixed solvent to prepare a mixed solution; and
    heat-treating the mixed solution.

3. The production method according to claim 1, wherein the diamine compound is a straight chain aliphatic diamine compound.

4. The production method according to claim 1, wherein the diamine compound is an aromatic diamine compound.

5. The production method according to claim 1, wherein the proportion of the alcohol in the mixed solvent is from 5% by volume to 25% by volume.

6. The production method according to claim 1, further comprising:
    evaporating water produced during the reaction.

7. The production method according to claim 1, wherein the aromatic nonpolar solvent is toluene, xylene, or a mixture thereof.

8. The production method according claim 1, wherein the alcohol has a lower boiling point than the aromatic nonpolar solvent.

9. The production method according to claim 1, wherein the alcohol is at least one selected from the group consisting of methanol, ethanol, 1-propanol, isopropanol, 1-butanol, 2-butanol, and isobutanol.

10. The production method according to claim 1, wherein a monofunctional phenol compound is further added to be reacted.

11. The production method according to claim 1, further comprising:
washing with a basic aqueous solution after the reaction.

12. The production method according to claim 2, wherein the diamine compound is a straight chain aliphatic diamine compound.

13. The production method according to claim 2, wherein the diamine compound is an aromatic diamine compound.

14. The production method according to claim 2, wherein the proportion of the alcohol in the mixed solvent is from 5% by volume to 25% by volume.

15. The production method according to claim 2, further comprising:
evaporating water produced during the reaction.

16. The production method according to claim 2, wherein the aromatic nonpolar solvent is toluene, xylene, or a mixture thereof.

17. The production method according to claim 2, wherein the alcohol has a lower boiling point than the aromatic nonpolar solvent.

18. The production method according to claim 2, wherein the alcohol is at least one selected from the group consisting of methanol, ethanol, 1-propanol, isopropanol, 1-butanol, 2-butanol, and isobutanol.

19. The production method according to claim 2, wherein a monofunctional phenol compound is further added to be reacted.

20. The production method according to claim 2, further comprising:
washing with a basic aqueous solution after the reaction.

* * * * *